(12) United States Patent
Lewis et al.

(10) Patent No.: US 9,280,829 B1
(45) Date of Patent: Mar. 8, 2016

(54) USING LINEAR FUNCTIONS TO CALCULATE DEPTH INFORMATION FOR SCENES ILLUMINATED WITH STRUCTURED LIGHT

(71) Applicant: Amazon Technologies, Inc., Seattle, WA (US)

(72) Inventors: Isabella Talley Lewis, San Jose, CA (US); Ji liang Song, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/750,810

(22) Filed: Jun. 25, 2015

(51) Int. Cl.
*G06K 9/00* (2006.01)
*G06T 7/00* (2006.01)
*H04N 13/00* (2006.01)
*G01B 11/22* (2006.01)

(52) U.S. Cl.
CPC .............. *G06T 7/0075* (2013.01); *G01B 11/22* (2013.01); *H04N 13/0022* (2013.01); *G06T 2207/10012* (2013.01); *G06T 2207/10028* (2013.01); *H04N 2013/0081* (2013.01)

(58) Field of Classification Search
None
See application file for complete search history.

(56) References Cited

U.S. PATENT DOCUMENTS

2011/0025827 A1* 2/2011 Shpunt .................. G06T 7/0057
348/47

* cited by examiner

*Primary Examiner* — Stephen R Koziol
*Assistant Examiner* — Elisa Rice
(74) *Attorney, Agent, or Firm* — Lee & Hayes, PLLC

(57) ABSTRACT

Technologies are described herein for using linear functions to calculate depth information for scenes illuminated with structured light. Instead of performing matrix operations to determine depth information for each dot of light projected onto a scene, the depth information associated with each projected dot is calculated of light using a linear function.

20 Claims, 6 Drawing Sheets

USING LINEAR FUNCTIONS TO CALCULATE DEPTH INFORMATION FOR SCENES ILLUMINATED WITH STRUCTURED LIGHT

BACKGROUND

Today, some systems utilize structured light to obtain depth and surface information for a particular scene. Generally, in a structured light system, a light pattern is projected on a scene and depth information for objects in the scene is determined from an image of the scene. For example, a projector may project a known pattern (e.g., dots, grids, or bars) on a scene and a camera may capture an image of the scene after the light patterns are projected. The image of the scene may then be analyzed to determine depth information for objects in the scene. Analyzing the image may require many mathematical calculations to determine the depth information. In some cases, these mathematical calculations may involve matrix operations, such as multiplications and inversions. These matrix operations may be computationally intensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
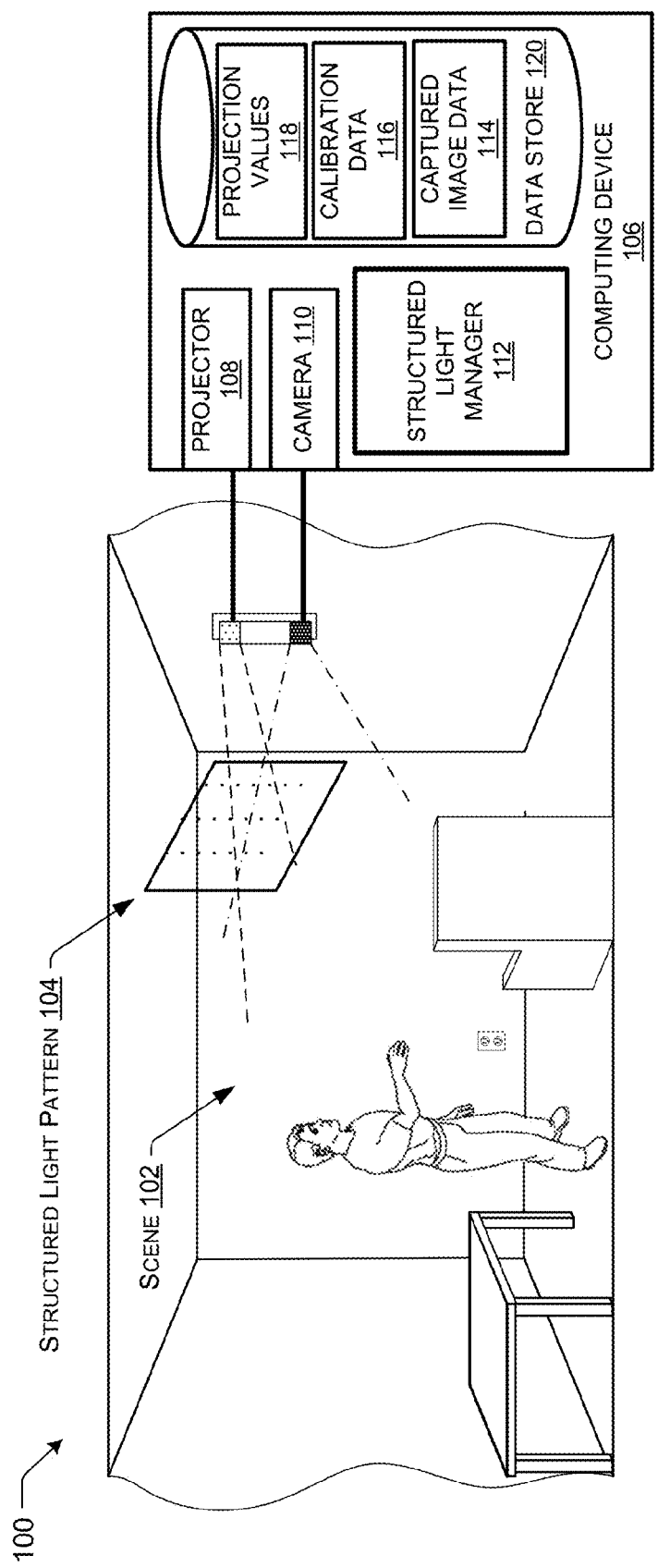
FIG. 1 is a system diagram showing an illustrative operating environment for using linear functions to calculate depth information for scenes illuminated with structured light.

The following detailed description is directed to technologies for using linear functions to calculate depth information for scenes illuminated with structured light. Utilizing the technologies described herein, instead of performing matrix operations to determine depth information associated with each dot projected onto a scene, the depth information associated with each projected dot is calculated using a linear function.

In some configurations, a projector illuminates a scene with structured light. For example, the projector may illuminate objects within a room with a structured light pattern, such as a grid of dots. In some examples, the projected dots are not visible to a user (e.g., infrared). Projector information that identifies positioning of the projector may also be stored for each projected dot within the light pattern.

After the scene is illuminated with the structured light pattern, a camera captures an image of the scene. The captured image may then be analyzed to determine the locations of the projected dots. Generally, the lower the resolution (e.g., VGA resolution) of the structured light pattern, the smaller number of the projected dots that are captured within the image. Correspondingly, the higher the resolution (e.g., 1080P resolution) of the projected structured light pattern, the larger the number of projected dots captured within the image.

After identifying the projected dots within the captured image, calibration data may be accessed to determine the linear functions to use in calculating the depth information for each of the dots within the captured image. In some configurations, different calibration images are created during a calibration of the projector and the camera. The different calibration images are obtained at different distances from the projector and camera. For example, a first calibration image might be captured at 1 m (away from the camera and projector) and a second calibration image might be captured at 2 m (away from the camera and projector).

In some configurations, at least two calibration images may be associated with a particular range from the camera. For example, a first calibration image might be captured at 0.8 m and a second calibration image might be captured at 2 m to cover the range from 0.5 m to 2.5 m, whereas other calibration images might be captured at other ranges. For instance, calibration images might be captured to cover the range from 2 m to 3 m and calibration images might be captured to cover a range from 3 m to 5 m.

After obtaining the different calibration images during the calibration of the projector and the camera, linear functions for each of the projected dots may be calculated. For example, a linear function may be calculated for each dot based on the position of the dot in each of the calibration images. For instance, a linear function may be determined from a line that includes a first calibration dot (e.g., the representation of the projected dot) within a first calibration image and a second calibration dot (that corresponds to the first calibration dot) within a second calibration image. In some configurations, the functions may be piecewise linear. For instance, instead of a single linear function to represent a particular projected dot, different linear functions may be associated with different ranges (e.g., a first linear function for a first range, a second linear function for a second range, and the like).

In some examples, each dot within the light pattern may have its own linear function (or more than one) that can be used to determine the depth data associated with the particular dot captured within the image. Generally, the linear function for each dot is based on the distance (B) between the camera and the projector, the location of the dot on the projector image that is used to determine (B'), and the focal length (f) of the camera. In some examples, the linear function may be represented as $1/Z = X/((B+B')*f)$. The depth information for each dot that is located may be calculated using the linear function that is associated with the dot.

By using linear functions to calculate the depth information for dots projected onto the scene, hundreds of computing operations for each dot may be saved. For instance, instead of possibly performing hundreds of operations per dot, using the linear functions may result in about twenty operations per dot. More details are provided below with regard to FIGS. 1-6.

FIG. 1 is a system diagram showing an illustrative operating environment 100 for using linear functions to calculate depth information for scenes illuminated with structured light. The environment 100 includes a scene 102 illuminated by a structured light pattern 104, such as a grid of dots projected onto the objects in the scene 102.

The computing device 106 may perform operations relating to determining depth data of a scene using linear functions and structured light. The computing device 106 may be a server, a desktop computing device, a smartphone, a tablet, or any other computing device 106 capable of performing the technologies described herein. The computing device 106 illustrated in FIG. 1 might execute a number of software modules in order to perform operations described herein. The modules may consist of a number of subcomponents executing on one or more computing devices.

As briefly discussed, structured light involves the projection of structured light onto a scene. In the current example, the scene 102 includes different objects (e.g., a table, chair, and person) within a room. The projector 108 can illuminate the scene 102 with structured light, such as a structured light pattern 104. In some configurations, the projector 106 projects a dot pattern (e.g., a grid of light dots) on the scene. Other structured light patterns, however, may be utilized to illuminate the scene.

The structured light that is projected by the projector 108 may comprise wavelengths non-visible to the user, wavelengths visible to the user, or both. In some examples, a structured light pattern 104 that uses visible light wavelengths may be configured such that the structured light pattern 104 is imperceptible or almost imperceptible to a user.

An image capture device, such as a camera 110, acquires an image of the scene 102 illuminated with the structured light pattern. As described herein for illustration and not by way of limitation, the combination of the projector 108 configured to generate structured light patterns 104 and the camera 110 to acquire images may be incorporated into a single unit or more than one unit. In some examples, the projector 108 and the camera 110 may be configured to pan and/or tilt such that different views of the scene 102 may be obtained.

The structured light manager 112 can use linear functions to calculate depth information for the scene 102 illuminated with the structured light pattern 104. As such, instead of performing matrix operations to determine depth information associated with each dot projected onto the scene 102, the depth information associated with each projected dot on the scene 102 is calculated by the structured light manager 112 on the computing device 106 using a linear function.

In some examples, the structured light manager 112 analyzes the captured image data 114 obtained from the camera 110 to determine the locations of the projected dots within the captured image data. According to some configurations, the structured light manager 112 selects dots that are adjacent to each other. In other examples, the dots that are selected may be farther apart in the captured image data (e.g., non-adjacent). Generally, the dots that are selected may form a shape that may be identified in the calibration data. For instance, the structured light manager 112 may determine that three dots in the captured image data 114 corresponds to the three dots in the calibration image. While the scale of the dots may be different in the captured image data 114, the angles between the dots will be the same. Other matching algorithms might be utilized to determine the location of the dots within the captured image data 114. Generally, the calibration data 116 that includes a positioning of dots that most closely matches the position of the dots within the captured image data (e.g., a best match) provides a location of the dots within the captured image data 116. Each light dot that is projected may be associated with a unique identifier. The identifier may be a simple number (e.g., dot 1, dot 2) or some other type of identifier (e.g., a, b, xx1, or the like).

In some examples, projection values 118 are stored for each dot that is projected within the structured light pattern 104. The projection values 118 provide information about the positioning of the projector 108 when a particular dot is projected onto the scene 102. The projection values 118 may be used by the structured light manager 112 when determining the positions of the dots in the captured image data 114.

The calibration images are analyzed to determine the linear function to associate with each unique dot position. As discussed briefly above, the linear function to associate with a particular projected dot may be determined from corresponding dots obtained within at least two calibration images. For example, a linear function may be determined from a line that passes through (or near) a first calibration dot (e.g., the representation of the projected dot) within a first calibration image and passes through (or near) a second calibration dot (that corresponds to the first calibration dot) within a second calibration image. More than two calibration images may be utilized to determine the linear function for a particular dot.

In some configurations, the linear functions may be piecewise linear. For instance, instead of a single linear function to represent a particular projected dot, different linear functions may be associated with different ranges. In some examples, a first linear function is used for a first range; a second linear function is used for a second range, and the like. Further, since the distances to the objects within the scene are known in the calibration images, a parameter may be included in the linear functions to account for projector and/or camera distortion, misalignment and/or an unknown camera optical center.

As briefly discussed, the calibration data 116 is used for determining the linear functions to utilize when determining the depth data for the scene 102. For example, the calibration data 116 may store the linear functions for use with each of the projected dots within the structured light pattern 104. In most cases, each dot within the structured light pattern 104 may have its own linear function that can be used to determine the depth data associated with the particular point.

Generally, the linear function for each dot is based on the distance (B) between the camera and the projector, the location of the dot on the projector image that is used to determine (B'), and the focal length (f) of the camera. In some examples, the linear function may be represented as $1/Z=X/((B+B')*f)$ and further as $Z=m*x+b$ (where m and b are determined from the calibration data 116). See FIG. 3 for an example graph showing the relationship between the different parameters. The depth information for each dot that is located may be calculated using the linear function that is associated with the dot in the calibration data 114.

After calculating the depth information for each dot within a captured image, the structured light manager 112 may output the depth data for use by one or more other processes. For example, an application might utilize the depth information of the scene 102 to determine the locations of the objects within the scene 102.

By using linear functions to calculate the depth information for dots projected onto the scene, hundreds of computing operations for each dot may be saved. For instance, instead of possibly performing hundreds of operations per dot, using the linear functions may result in about twenty operations per dot.

Figure 2:
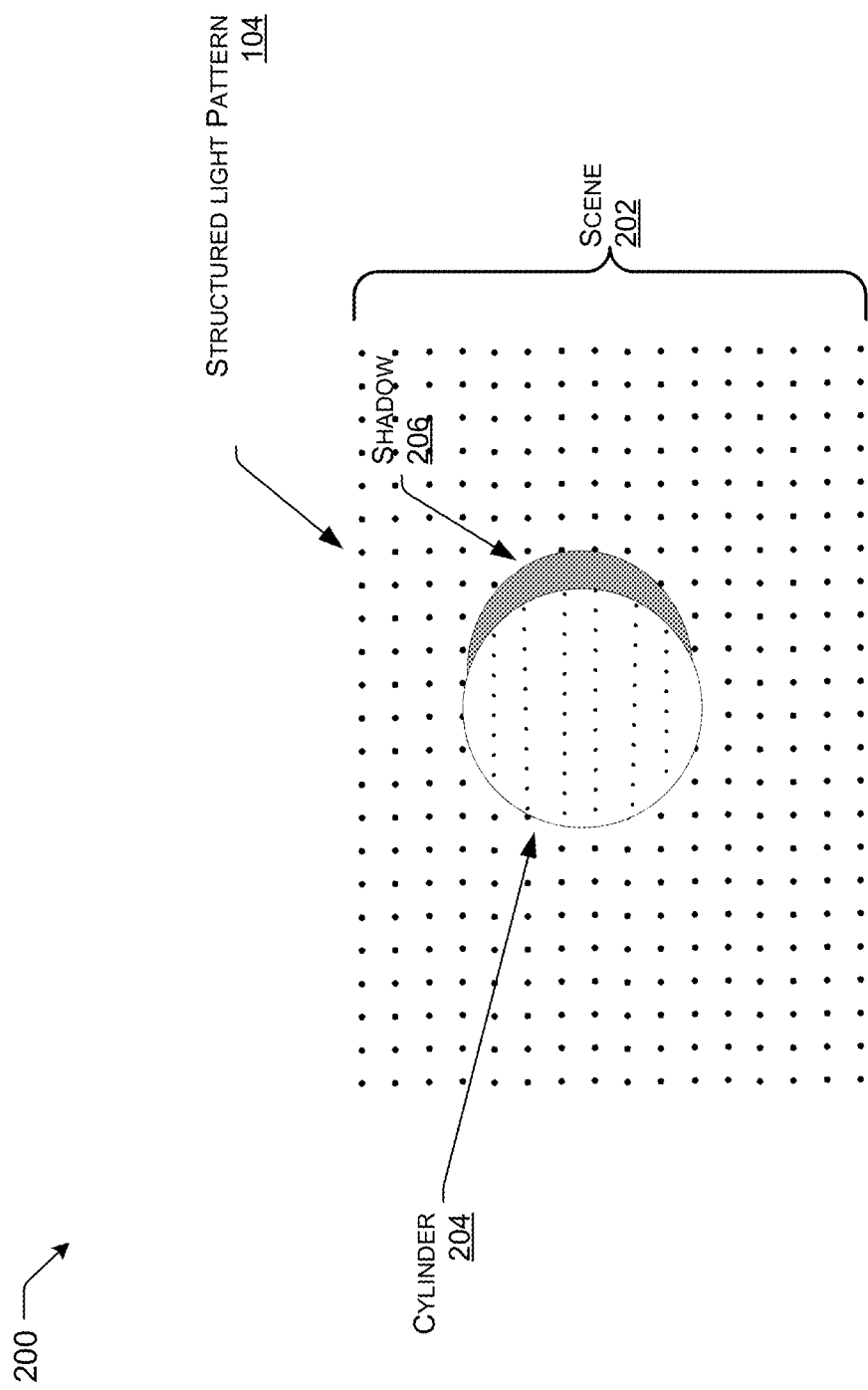
FIG. 2 is a diagram of a system using structured light to identify depth information for objects within an environment.

FIG. 2 is a diagram of a system 200 using structured light to identify depth information for objects within an environment. The example illustrated in FIG. 2 is a top view of a scene 202. As illustrated, the projector 108 (not shown) projects a structured light pattern 104 onto the scene 202. In some examples, the structured light pattern 104 is a grid of dots. The spacing between dots projected onto the scene 202 may be uniform or non-uniform. In other examples, different structured light patterns, such as different grid patterns might be used.

In some configurations, one or more other devices (e.g., general room lighting) may generate structured light patterns. A light fixture, bulb, and so forth may be configured such that emitted light contains one or more structured light patterns 104. For example, two structured light patterns may be presented, each at a different non-visible wavelength within the structure of an incandescent bulb.

The camera 110 (not shown), or some other image capture device, may be used to capture an image of the scene 202 after the structured light is projected onto the scene 202. The camera 110 may be a separate device, or the camera may be integrated with the projector into an assembly that also includes the projector 108. The projector 108 and/or the camera 110 may be configured to communicate with the computing device 106 illustrated in FIG. 1 wirelessly or via a wired connection.

As previously discussed, the structured light pattern 104 may be projected in wavelengths that are visible to a user, non-visible to the user, or a combination thereof. In FIG. 2, the structured light pattern 104 is shown as a grid of light dots for ease of illustration and not as a limitation. In other examples, other patterns, such as bars, dots, pseudorandom noise, and so forth may be used. Pseudorandom Noise (PN) patterns may be useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some examples, more than one structured light pattern 104 may be used. These may include different PN patterns, geometric shapes, and so forth.

For illustrative purposes, a cylinder 204 is positioned between the projector 108 and a wall in the scene 202. As can be seen, the dots on the top of the cylinder 204 appear to be closer together as compared to the dots that are not projected onto the cylinder 204. Generally, the closer the dots are spaced together indicates that the object is closer to the camera as compared to dots that are spaced farther apart. A shadow 206 from the cylinder 204 appears on the scene 202. In some examples, a deformation or distortion effect of the structured light pattern 104 may be created as the structured light pattern 104 interacts with the surface of an object in the scene 202.

In some examples, other effects, such as dispersion of the structured light pattern 104, may be used to provide depth information relating to the topology of the scene 202. Where the projector 108 and camera 110 have differing fields of view, the dispersion or change in the "density" of the structured light pattern 104 may be used to determine depth of field.

Figure 3:
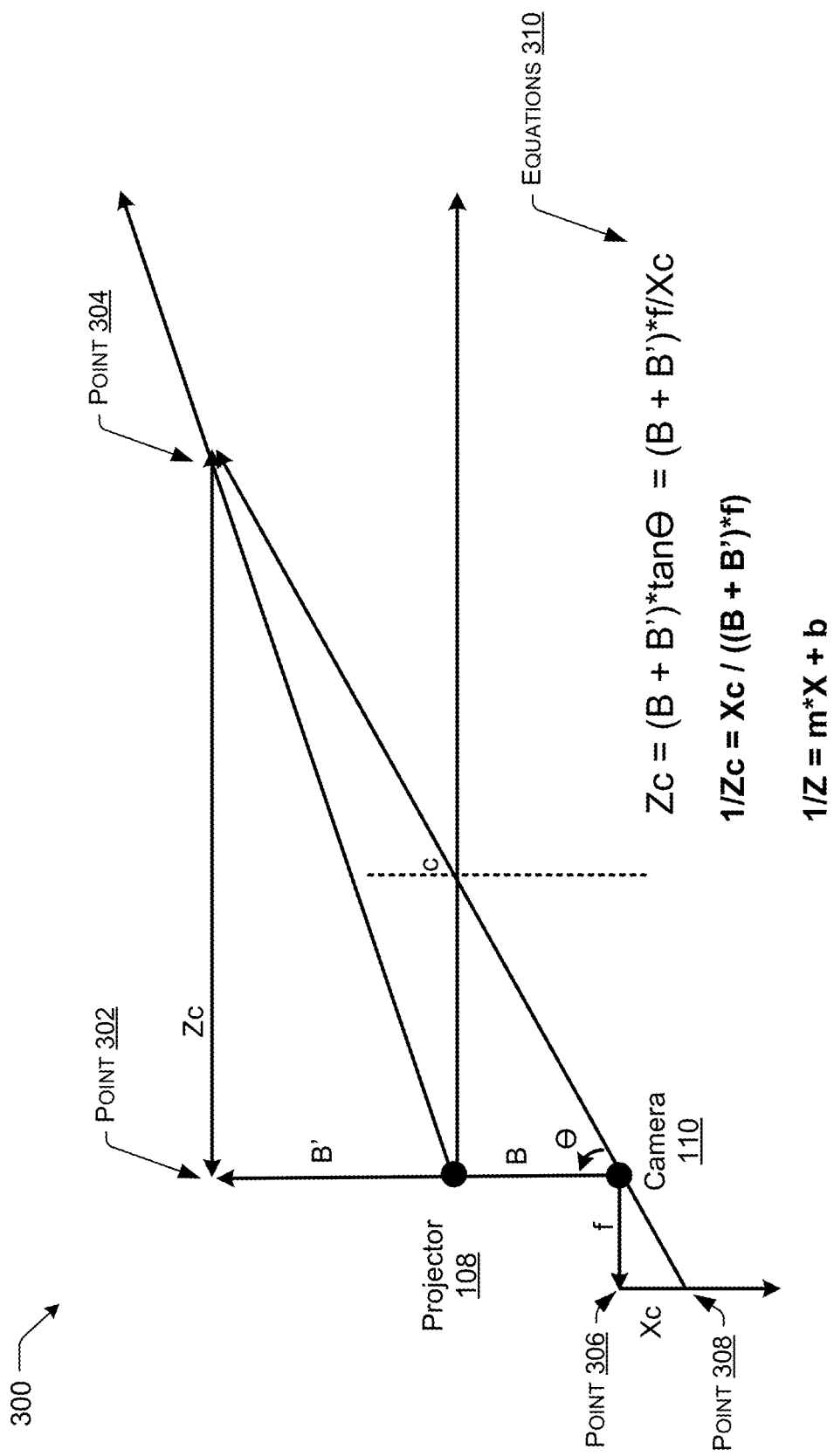
FIG. 3 is a diagram that shows an example of a linear fit of a function to a projected dot onto a scene.

FIG. 3 is a diagram 300 that shows an example of a linear fit of a function to a projected dot onto a scene. The diagram 300 is a general application of a linear function to a particular projected dot "c".

In the example shown in FIG. 3, the general linear function for determining depth data associated with a particular dot projected onto a scene may be:

$$Z_c = (B + B') * \tan\theta = ((B + B') * f)/X_c \text{ so } 1/Z_c = \frac{X_c}{(B + B') * f}$$

wherein "B" is the distance between the projector 108 and the camera 110. B' is the distance between the projector 108 and the point 302. θ is the angle of the camera 110 relative to the projected dot (c). f is the focal length of the camera 110. $X_c$ is the distance between the camera 110, as indicated between the point 306 and the point 308.

As can be seen by referring to FIG. 3, the B' value changes for each dot that is projected onto the scene by the projector 106. Similarly, the $X_c$ distance, and θ also change. As such, for each dot that is located within the captured image data 114, a separate linear function may be associated with each dot. As discussed in more detail herein, in some configurations, calibration data is accessed to determine parameters of a linear function such that the depth function becomes depth=m*X+b where m is the slope of the reference line associated with the dot and b is an offset.

Figure 4:
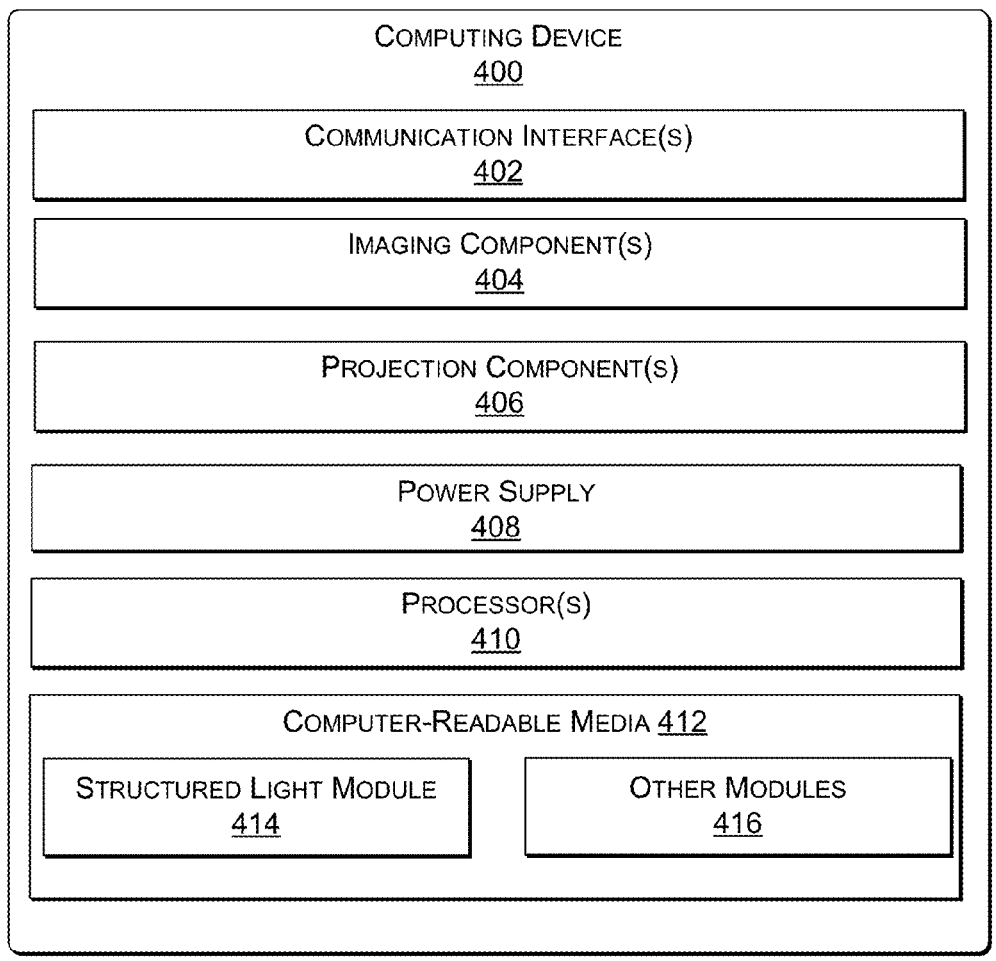
FIG. 4 illustrates an example architecture of a computing device that might be utilized.

FIG. 4 illustrates an example architecture of a computing device, such as the computing device 106 of FIG. 1. In various examples, the architecture may be illustrative of one or more aspects of the computing device that may be used in calculating depth information for a scene illuminated with a structured light pattern using linear functions as described herein. In some cases, the computing device 400 may be implemented as a standalone device that is configured to perform some or all of the operations described herein. In other cases, the computing device 400 may be configured to communicate with one or more other devices or modules to perform the operations described herein.

Thus, in some implementations, the computing device 400 may include one or more communication interfaces 402 to facilitate communication and/or data transfer (such as the captured image data 114) between one or more networks that include one or more computing devices.

In some cases, the communication interfaces 402 may also facilitate communication between one or more wireless access points, a master device and/or one or more other computing devices as part of an ad-hoc or home network system. For example, the communication interfaces 402 may support wireless connection, such as radio, Wi-Fi, short-range or near-field networks (e.g., Bluetooth®), infrared signals, and so forth.

The computing device 400 may also include one or more imaging components 404. For example, the imaging component 404 may include one or more image capture devices, such as the cameras 110, that may be configured to capture images of the scene 102 that is illuminated with the structured light pattern 104. In some configurations, the imaging component 404 may have a field of view that may be fixed, while in other cases the field of view may be movable and/or zoomable.

In some cases, more than one imaging component 404 may be used. For example, the computing device 400 may include an infrared camera, and/or a red-green-blue camera. In one example, infrared camera may be configured to capture data related to depths, location, and movement of objects within the field of view. While the red-green-blue camera may be configured to detect edges of objects by identifying changes in color within the field of view.

The computing device 400 may also include one or more projection components 406. For example, the projection component 406 may include one or more projectors 108 that may be configured to illuminate the scene 102 with the structured light pattern 104. In some configurations, the projection component 404 may be operative to project a grid of dots onto the scene 102.

The computing device 400 includes, or accesses, components such as a power supply component 408, at least one control logic circuit, central processing unit, one or more processors 410, in addition to one or more computer-readable media 412 to perform the functions of utilizing the linear functions to determine depth information associated with a scene illuminated by structured light. Additionally, each of the processors 410 may itself comprise one or more processors or processing cores.

Depending on the configuration of the computing device 400, the computer-readable media 412 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 410.

Several modules such as instruction, data stores, and so forth may be stored within the computer-readable media 412 and configured to execute on the processors 410. Structured light module 414 may be configured to process the image data collected by the image components 404 in order to determine the depth information utilizing the linear functions. The structured light module 414 may be stored in the computer-readable media 412 and configured to perform the operations of the structured light manager 110 described herein.

In some cases, the computing device 400 may also include one or more other modules 416 for assisting in the determination of the depth data. For example, one or more operating systems may be stored within the computer-readable media 412.

Figure 5:
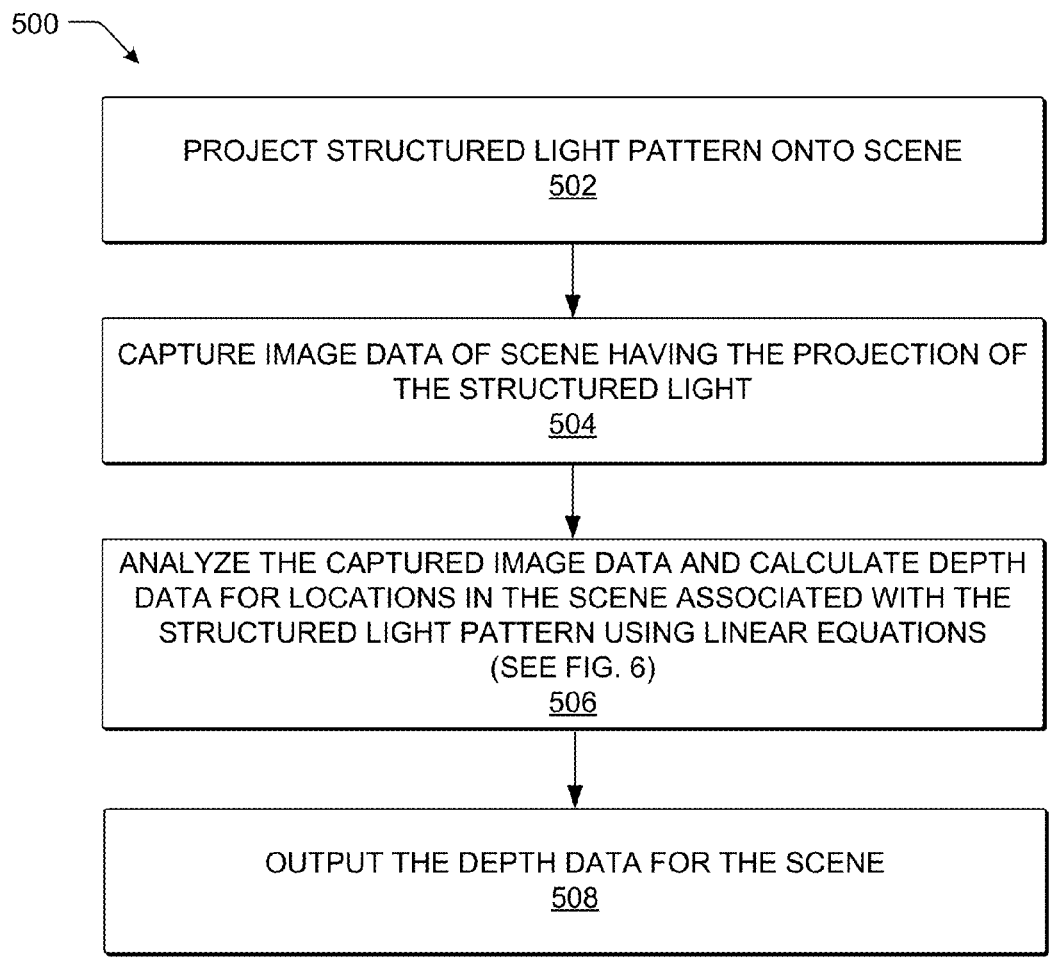
FIG. 5 is an example flow diagram showing an illustrative process for using linear functions to determine depth information from a scene illuminated by structured light.
Figure 6:
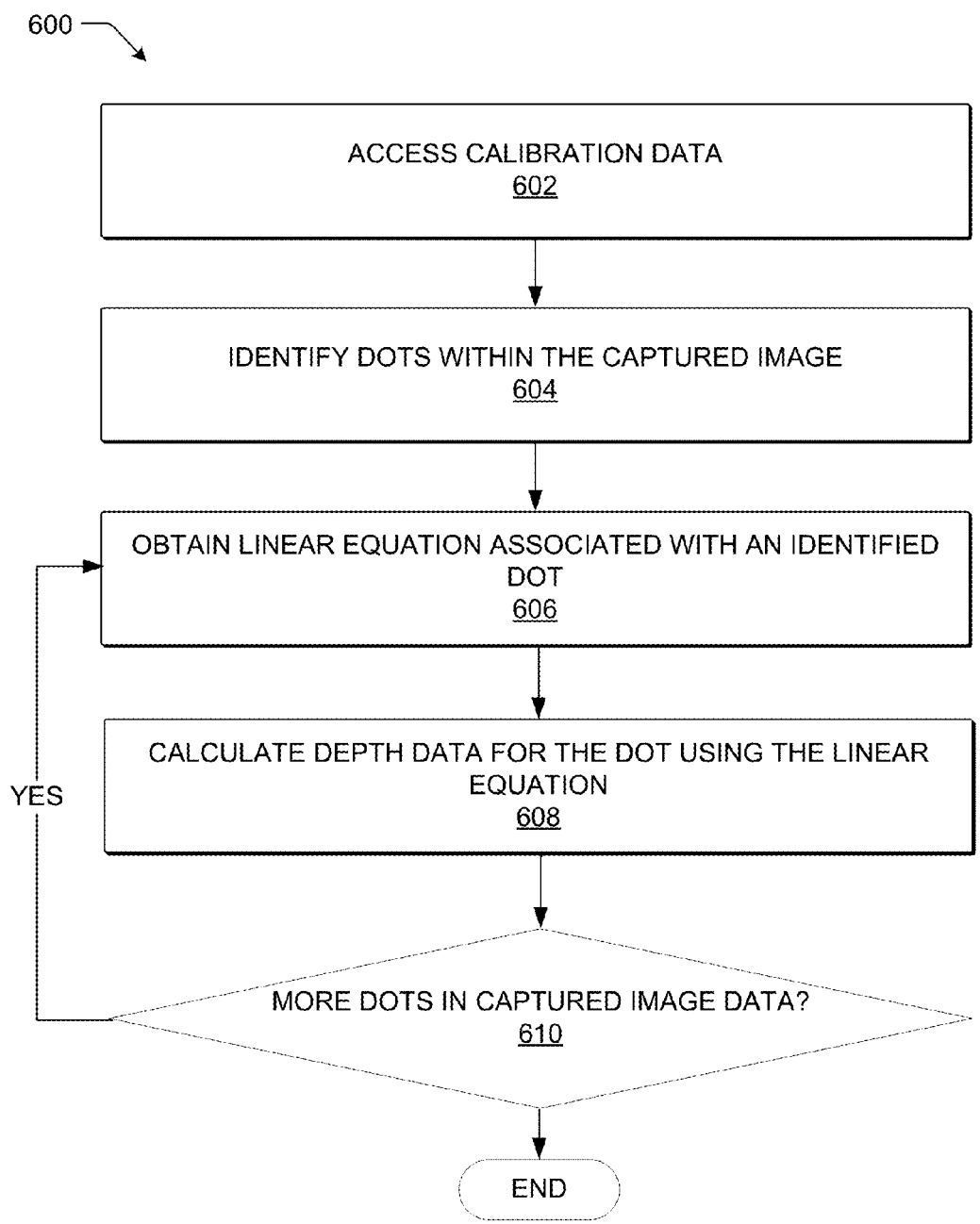
FIG. 6 is an example flow diagram showing an illustrative process for calculating depth data using linear functions.

FIGS. 5 and 6 provide example flow diagrams illustrating example processes for implementing the structured light systems utilizing linear functions as described above. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

FIG. 5 is an example flow diagram showing an illustrative process 500 for using linear functions to determine depth information from a scene illuminated by structured light. The process 500 may be performed by the structured light manager 112, or some other component or device as described herein.

At 502, the projector 108 projects a structured light pattern 104 onto a scene, such as the scene 102. As discussed above, the projector 108 may illuminate the scene 102 with a pattern of dots (e.g., arranged in a grid), such as illustrated in FIG. 1 and FIG. 2. The projector 108 may illuminate the scene 102 with visible and/or non-visible light. According to some examples, the projector 108 is a light projector, a semiconductor laser, or some other projector configured to illuminate the scene with structured light.

At 504, the camera 110, or some other imaging capture device, captures image data associated with the projection of a structured light pattern onto a scene. As discussed above, the camera 110 may capture the image data 114 for the scene 102 illuminated with the structured light pattern 104. The captured image data 114 includes a representation of the projected dots within the structured light pattern 104.

At 506, the structured light manager 112 analyzes the captured image data 114 and calculates the depth data for the objects in the scene using linear functions. Generally, the structured light manager 112 may identify the projected dots represented within the captured image data 114, and obtain the associated linear function for the projected dot from the calibration data 116. The structured light manager 112 then uses the linear functions, obtained from the calibration data 116, to use when calculating the depth data for each of the dots from the captured image data 114. More details are provided below with regard to FIG. 6.

At 508, the structured light manager 112 outputs the depth data for the scene 102. As discussed above, the structured light manager 112 may output the depth data for use by one or more other processes.

FIG. 6 is an example flow diagram showing an illustrative process 600 for calculating depth data using linear functions. The process 600 may be performed by a structured light manager 112, or some other component or device.

At 602, the calibration data 116 is accessed. As discussed above, the calibration data 116 may include captured image data obtained from different known distances from the camera and/or the projector. The calibration data 116 may also include the linear equations for one or more of the dots.

At 604, the structured light manager 112 identifies the projected dots of the structured light pattern 104 within the captured image data 114. As discussed above, the structured light manager 112 may perform a pattern matching technique to determine the positions of the dots within the captured image data 114. In some examples, three or more dots may be used to form a shape that may be used by the structured light manager 112 to pattern match with three or more dots in the calibration data 116.

At 606, the structured light manager 112 obtains the linear function associated with one of the dots within the captured image data 114. As discussed above, the calibration data 116 may store a linear function for each of the different dots that are projected onto a scene. In some examples, the calibration data 116 may store a linear function for a group of dots (e.g., a linear function for a group of nine dots). The structured light manager 112 may interpolate the linear function to determine the linear function to use for a particular dot within the group of dots. For instance, the linear equations that are associated with a group of adjacent dots may be similar to each other. Instead of storing a linear equation for each dot, storage may be saved by storing a fraction of the linear equations.

At 608, the structured light manager 112 calculates the depth data for the dot using the linear function associated with the dot. As discussed above, in some examples, the linear function follows the form: depth=m*X+b. The depth data may be stored in a memory, such as the data store 120 illustrated in FIG. 1.

At 610, the structured light manager 110 determines whether there are more dots within the captured image data 114 in which to determine depth data. As discussed above, the structured light manager 112 may access all or a portion of the dots identified within the captured image data 114. When there are more dots, the process 600 returns to 606. When there are not more location areas to analyze, the process 600 moves to an end operation.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method to determine depth information for a scene, comprising:
    projecting, from a projector, a structured light pattern onto the scene, wherein the structured light pattern projected onto the scene includes dots of light arranged in a grid pattern;
    capturing, with a camera, an image of the scene that includes a representation of the structured light pattern;
    accessing calibration data, the calibration data including a first linear function that determines points on a first line that includes a first calibration dot within the a first calibration image and a corresponding first calibration dot within a second calibration image and a second linear function that determines points on a second line that includes a second calibration dot within the first calibration image and a corresponding second calibration dot within the second calibration image;
    identifying a representation of a first projected dot within the image of the scene, the first projected dot corresponding to the first calibration dot and to the corresponding first calibration dot;
    calculating first depth data for the first projected dot using the first linear function, the first depth data indicating a first distance of the first projected dot from the projector;
    identifying a representation of a second projected dot within the image of the scene, the second projected dot corresponding to the second calibration dot and to the corresponding second calibration dot; and
    calculating second depth data for the second projected dot using the second linear function, the second depth data indicating a second distance of the second projected dot from the projector.

2. The method of claim 1, wherein the first calibration image is captured at a first known distance from the projector and the second calibration image is captured at a second known distance from the projector, wherein the first known distance is less than the second known distance, and wherein the first known distance and the second known distance determine a first range of distances for objects in the scene.

3. The method of claim 2, wherein the calibration data includes a third calibration image captured at a third known distance from the projector and a fourth calibration image captured at a fourth known distance from the projector, wherein the third known distance and the fourth known distance determine a second range of distances for objects in the scene.

4. The method of claim 3, further comprising:
    determining that a representation of a third projected dot within the image of the scene is associated with the second range;
    selecting a third linear function from the calibration data, wherein the third linear function determines points on a third line that includes a third calibration dot within the third calibration image and a corresponding third calibration dot within the fourth calibration image; and
    calculating third depth data for the second projected dot using the third linear function, the third depth data indicating a third distance of the third projected dot from the projector.

5. The method of claim 3, wherein identifying the representation of the first projected dot within the image of the scene comprises determining that the representation of the first projected dot is the first dot within the structured light pattern and wherein identifying that the representation of the second projected dot within the image of the scene comprises determining that the representation of the second dot is the second dot within the structured light pattern.

6. A system, comprising:
    a projection device operative to project a structured light pattern onto a scene;
    an image capture device; and
    one or more computing systems, operative to perform actions, including:
        causing the projection device to project the structured light pattern onto the scene;
        causing the image capture device to capture image data for the scene, the image data including a representation of at least a portion of the structured light pattern; and
        calculating depth data for the at least a portion of the scene using one or more linear functions selected based, at least in part, on the representation of the at least the portion of the structured light pattern, wherein the depth data indicates distances of objects in the scene from one or more of the projection device or the image capture device.

7. The system of claim 6, wherein causing the projection device to project the structured light pattern, comprises projecting a grid of light dots onto the objects within the scene.

8. The system of claim 6, wherein the one or more computing devices are further configured to access calibration data, the calibration data including a first linear function that determines points on a first line that includes a first calibration dot within a first calibration image and a corresponding first calibration dot within a second calibration image and a second linear function that determines points on a second line that includes a second calibration dot within the first calibration image and a corresponding second calibration dot within the second calibration image.

9. The system of claim 8, wherein calculating the depth data comprises:
    calculating first depth data associated with a first representation of a first dot of the structured light pattern using the first linear function; and
    calculating second depth data associated with a second representation of a second dot of the structured light pattern using the second linear function.

10. The system of claim 8, wherein the calibration data includes a third calibration image and a fourth calibration image, wherein the third calibration image and the fourth calibration image define a third linear function.

11. The system of claim 10, wherein calculating the depth data comprises calculating third depth data for a first representation of a first dot of the structured light pattern within the image data using the third linear function.

12. The system of claim 6, wherein calculating the depth data comprises identifying a representation of a first projected dot within the image of the scene and selecting a first linear function associated with the first projected dot to calculate the depth data.

13. The system of claim 8, wherein the calibration data includes linear functions associated with a first range of distances from the scene and one or more linear functions associated with a second range of distances from the scene.

14. The system of claim 6, wherein calculating the depth data comprises accessing a first set of linear functions for a first range and accessing a second set of linear functions for a second range.

15. The system of claim 6, wherein calculating the depth data comprises:
- accessing calibration data that includes a first linear function that is associated with multiple dots of a structured light pattern;
- interpolating the first linear function to create a second linear function for a first projected dot of the multiple dots; and
- using the second linear function to calculate the depth data for a representation of the first projected dot within the image.

16. A method comprising:
- causing a projection device to project a structured light pattern onto objects within a scene, the structured light pattern including a grid of light dots;
- causing an image capture device to capture image data for at least a portion of the scene; and
- calculating first depth data for a first projected dot identified within the image data using a first linear function, the first linear function selected from a plurality of linear functions, wherein the first linear function is associated with a first projected dot within the grid of light dots.

17. The method of claim 16, further comprising accessing calibration data, the calibration data including the first linear function that determines points on a first line that includes a first calibration dot within a first calibration image and a corresponding first calibration dot within a second calibration image and a second linear function that determines points on a second line that includes a second calibration dot within the first calibration image and a corresponding second calibration dot within the second calibration image.

18. The method of claim 17, wherein calculating the depth data comprises calculating second depth data associated with a second representation of a second projected dot of the structured light pattern using a second linear function.

19. The method of claim 16, further comprising accessing calibration data that includes linear functions associated with a first range of distances from the scene and one or more linear functions associated with a second range of distances from the scene.

20. The method of claim 17, wherein calculating the depth data comprises accessing a first set of linear functions for a first range and accessing a second set of linear functions for a second range.

* * * * *